United States Patent
Tanaka et al.

(10) Patent No.: US 7,148,291 B2
(45) Date of Patent: Dec. 12, 2006

(54) THERMOPLASTIC ELASTOMER COMPOSITION AND MOLDED MEMBER MADE OF THE SAME

(75) Inventors: Chikara Tanaka, Hiroshima (JP); Masaaki Onishi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 191 days.

(21) Appl. No.: 10/760,754

(22) Filed: Jan. 20, 2004

(65) Prior Publication Data
US 2004/0157998 A1    Aug. 12, 2004

(30) Foreign Application Priority Data
Feb. 7, 2003    (JP) .............................. 2003-030533

(51) Int. Cl.
*C08L 23/20* (2006.01)
*C08F 279/02* (2006.01)

(52) U.S. Cl. ...................... 525/240; 525/232; 525/242; 525/191; 524/499

(58) Field of Classification Search ................ 525/240, 525/232, 242, 191; 524/499
See application file for complete search history.

(56) References Cited

U.S. PATENT DOCUMENTS

| | | | |
|---|---|---|---|
| 3,658,752 A | 4/1972 | Balbhadra | |
| 4,978,717 A * | 12/1990 | Hazelton et al. | 525/195 |
| 6,242,525 B1 | 6/2001 | Raetzsch et al. | |
| 6,340,531 B1 | 1/2002 | Konda et al. | |
| 6,777,476 B1 * | 8/2004 | Jeong et al. | 524/424 |
| 6,800,693 B1 * | 10/2004 | Nishihara et al. | 525/191 |

FOREIGN PATENT DOCUMENTS

| | | |
|---|---|---|
| EP | 0 699 522 | 3/1996 |
| JP | JP 09 176389 | 7/1997 |

\* cited by examiner

*Primary Examiner*—James J. Seidleck
*Assistant Examiner*—Olga Asinovsky
(74) *Attorney, Agent, or Firm*—Brooks Kushman P.C.

(57) ABSTRACT

The thermoplastic elastomer composition of this invention includes 2 through 14 mass % of PP; 19 through 35 mass % of PB-1; and 30 through 52 mass % of olefin-based rubber, and a weight ratio of PB-1/(PP+PB-1) is 56 through 90% and a weight ratio of PB-1/(PP+(PB-1)+olefin-based rubber) is 25 through 47%.

2 Claims, 7 Drawing Sheets

EPDM+EOR

↔ 1 μm

EPDM

↔ 1 μm

THERMOPLASTIC ELASTOMER COMPOSITION AND MOLDED MEMBER MADE OF THE SAME

BACKGROUND OF THE INVENTION

1. Field of the Invention

The present invention relates to a thermoplastic elastomer composition and a molded member made of the thermoplastic elastomer composition. More particularly, the present invention relates to, for example, a thermoplastic elastomer composition applicable to a surface material of a vehicle.

2. Background Art

As the trim of a vehicle such as a car, a material obtained by laminating, with polyurethane foam sandwiched therebetween, a surface material of a vinyl chloride-based resin on a substrate of an ABS resin, a modified polyphenylene ether resin, polypropylene (hereinafter referred to as PP), or the like has been used.

There is a demand for improving the recycle ratio of materials used in vehicles in order to protect the environment. Hence, vehicle trims are required to be fabricated from materials having high recycle ratios. The vinyl chloride-based resin has been widely employed as the surface material of vehicle trims. However, the vinyl chloride-based resin is difficult to recycle, particularly in a burn process. Therefore, fabricating a trim surface material by using a material other than the vinyl chloride-based resin is required.

Accordingly, as the surface material to be substituted for the vinyl chloride-based resin, an olefin-based thermoplastic elastomer (TPO) including PP and olefin-based rubber has been proposed.

Also, for example, Japanese Laid-Open Patent Publication No. 9-176389 discloses a thermoplastic elastomer in which poly(1-butene) is substituted for part of the PP for scratch resistance.

However, the TPO is clammy when its surface is touched with a hand, and is difficult to practically use because of its poor tactile quality (namely, because it is unpleasant to touch). In order to solve this problem, examination is being made to coat a TPO surface material, but the coating disadvantageously increases the fabrication cost.

SUMMARY OF THE INVENTION

The present invention was devised in consideration of the aforementioned situations, and an object of the invention is providing a thermoplastic elastomer composition that has a tactile quality equivalent to or higher than that of a vinyl chloride-based resin. Another object of the invention is providing a molded member made of the thermoplastic elastomer composition without a relatively large increase in the fabrication cost.

The thermoplastic elastomer composition of this invention includes 2 through 14 mass % of polypropylene (PP); 19 through 35 mass % of poly(1-butene) (PB-1); and 30 through 52 mass % of olefin-based rubber including an ethylene-propylene-diene monomer and having an SP (Solubility Parameter) value of 7.5 through 8.5.

In this thermoplastic elastomer composition, a weight ratio of PB-1/(PP+PB-1) is 56 through 90% and a weight ratio of PB-1/(PP+(PB-1)+olefin-based rubber) is 25 through 47%.

The PB-1 has a smaller elastic modulus and is softer than the PP. Therefore, when the PB-1 is substituted for part of the PP, hardness feeling can be improved. Namely, the resultant composition feels softer. Also, the PP has an SP (Solubility Parameter) value of 8.1, which is substantially the same as that of the PB-1 (the SP value of the PB-1 is 8.3). Therefore, compatibility (i.e., easiness in mixing) between the PP and the PB-1 is high. Hence, these components mix well with each other so as to homogenize a layer of the resin component. As a result, the hardness feeling can be definitely improved.

Furthermore, when the olefin-based rubber has an SP value substantially the same as the SP value of the PP (which is 8.1), the compatibility (i.e., easiness in mixing) between the PP and the olefin-based rubber can be improved, so that the rubber component can be finely dispersed in the resin component. As a result, humidity feeling can be improved. In other words, the resultant composition does not feel clammy but feels dry.

In this case, the content of the PP is preferably 2 through 14 mass %. Because the PB-1 is a liquid a molded member made of the thermoplastic elastomer composition cannot keep its shape if the content of the PP (which is a solid) is too small. On the other hand, if the content of the PP is too large, then the surface of the molded member becomes hard and hence the hardness feeling is degraded.

Furthermore, the content of the PB-1 is preferably 19 through 35 mass %. If the content of the PB-1 is too small, then the surface of the molded member made of the thermoplastic elastomer composition becomes hard. Hence, the hardness feeling is degraded. On the other hand, if the content of the PB-1 is too large, then the molded member cannot keep its shape.

Moreover, the content of the olefin-based rubber is preferably 30 through 52 mass %. If the content of the olefin-based rubber is too small, then the surface of the molded member made of the thermoplastic elastomer composition becomes hard. Hence, the hardness feeling is degraded. On the other hand, if the content is too large, then the surface feels clammy and the humidity feeling is degraded.

The proportions among the PP, the PB-1, and the olefin-based rubber in the thermoplastic elastomer composition satisfy the weight ratio of PB-1/(PP+(PB-1)) of 56 through 90% and the weight ratio of PB-1/(PP+(PB-1)+olefin-based rubber) of 25 through 47%. Thus, the humidity feeling and the hardness feeling, which are the feeling factors largely affecting the tactile quality of the molded member, can be consistent with each other. In other words, a clammy feeling can be avoided and a soft touch can be secured definitely at a high level. As a result, the tactile quality equivalent to or higher than that of a vinyl chloride-based resin can be attained.

The olefin-based rubber may further include ethylene-octene rubber. Thus, the fabrication cost of the thermoplastic elastomer composition can be lowered without degrading the humidity feeling and the hardness feeling.

The olefin-based rubber preferably has a particle size of 0.3 μm or more. When the particle size of the rubber is too small, the impact resistance of the molded member made of the thermoplastic elastomer composition is lowered. Furthermore, when the rubber particle size is set to 0.3 μm or more, there is no need to refine the rubber and hence the fabrication cost can be lowered.

The molded member of this invention is obtained by molding the aforementioned thermoplastic elastomer composition.

In the molded member, an average coefficient of friction on a surface thereof is 0.27 or less, and the molded member has a displacement-load characteristic in which a compression work load is 0.022 gf·cm/cm$^2$ or more in a region of a maximum load per cm$^2$ of 30 gf or less.

This is thus defined because the humidity feeling and the hardness feeling of the molded member depend upon its friction characteristic and its compression characteristic. In other words, this definition is based on the finding that the tactile quality can be quantitatively measured for determining the degree of the tactile quality through quantification of these characteristics. Specifically, when the average coefficient of friction affecting the humidity feeling falls in the aforementioned range, the tactile quality (humidity feeling) equivalent to or higher than that of a vinyl chloride-based resin can be stably attained. Also, when the compression work load affecting the hardness feeling falls in the aforementioned range, the tactile quality (hardness feeling) equivalent to or higher than that of a vinyl chloride-based resin can be stably attained.

A compression recovery property of the molded member is preferably 53 through 65% in the region in the displacement-load characteristic. When the compression recovery property falls in this range, the tactile quality equivalent to or higher than that of a vinyl chloride-based resin can be stably attained.

More preferably, a compression recovery work load is 0.012 gf·cm/cm$^2$ or more and a compression distortion is 0.0019 cm or more in the region in the displacement-load characteristic. When the compression characteristics (i.e., the compression recovery work load and the compression distortion) fall in the aforementioned ranges, the tactile quality equivalent to or higher than that of a vinyl chloride-based resin can be stably attained.

In the molded member, the olefin-based rubber preferably has a particle size of 0.3 μm or more, and the olefin-based rubber preferably has a maximum particle size of 3 μm or less in a surface portion of the molded member.

As described above, when the particle size of the olefin-based rubber is 0.3 μm or more, the impact resistance of the molded member can be secured. Also, the particle size of the rubber in the surface portion of the molded member affects the humidity feeling, and when the rubber particle size is larger, the surface feels clammier. Therefore, the maximum particle size of the olefin-based rubber in the surface portion of the molded member is preferably 3 μm or less. Thus, the humidity feeling of the molded member can be improved.

The molded member is suitably used as a trim material for a vehicle because it has a tactile quality equivalent to or higher than that of a vinyl chloride-based resin.

DETAILED DESCRIPTION OF THE INVENTION

A preferred embodiment of the invention will now be described with reference to the accompanying drawings.

(1) Organoleptic evaluation:

First, organoleptic evaluation on the basis of the actual tactile sense of a human being carried out for quantitatively evaluating the pleasantness and the characteristic of the touch (tactile quality) of a vehicle trim surface (i.e., a molded member) will be described. In this embodiment, in order to obtain systematic data about the tactile sense of a human being, a group (evaluation group) consisting of thirty human being subjects of all ages and both sexes is set, so that the tactile quality of each of a variety of trim surface materials can be evaluated by this evaluation group for obtaining data about the tactile quality.

In this organoleptic evaluation, with respect to each of the surface material samples, four feeling factors are checked. The four feeling factors include a humidity feeling (whether the sample feels clammy or dry), a texture feeling (whether the sample feels smooth or rough), a temperature feeling (whether the sample feels warm or cool), and a hardness feeling (whether the sample feels soft or hard). As the evaluation method, "the paired comparison method" in which the subjects can easily grasp relationship between samples is employed. By this method, all of the thirty subjects evaluate each sample with respect to the aforementioned four feeling factors. Thereafter, with respect to each sample, all data are statistically processed for digitizing (scoring) the evaluation result of each feeling factor, which is regarded as an index of the evaluation result.

On the basis of the results of the organoleptic evaluation test, the degree of contribution of each feeling factor to the tactile quality is examined. As a result, it has been found that the humidity feeling and the hardness feeling largely affect the tactile quality.

(2) Measurement method for physical characteristics:

Next, measurement methods and measurement conditions for measuring physical characteristics according to (correlative to) the organoleptic evaluation of the tactile quality are examined.

In the organoleptic evaluation test for the tactile quality, a subject makes two motions. Namely, a subject rubs the surface of a sample and pushes the sample. In these motions, the rubbing motion corresponds to a friction characteristic of a surface material and the pushing motion corresponds to a compression characteristic of the surface material.

Figure 1:
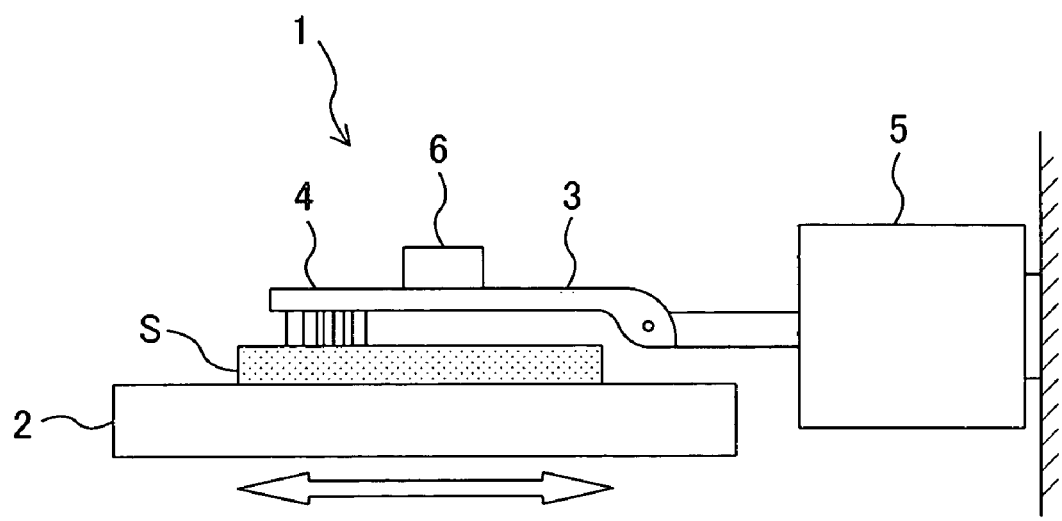
FIG. 1 is a diagram for showing the structure of a test apparatus used in a friction characteristic test.

2-1) Friction characteristic:

The friction characteristic seems to correspond to an index of the humidity feeling and the texture feeling, and the friction characteristic of each sample is measured by using a test apparatus 1 (a KES friction tester) whose structure is roughly shown in FIG. 1. Specifically, a sample S is placed and fixed on a sample table 2, and a contactor 4 provided on the tip of an arm 3 is allowed to come in contact with the surface of the sample S. The contactor 4 includes a large number of piano wires, and these piano wires are in contact with the surface of the sample S. A friction sensor 5 is disposed on the base of the arm 3 on which a weight 6 is placed. Under these conditions, the table 2 is moved on a horizontal plane, so as to cause frictional force between the surface of the sample S and the piano wires, which is measured with the friction sensor 5. In this manner, the friction characteristic of the sample S can be measured. It is noted that the frictional force to be caused can be changed by changing the weight 6 placed on the arm 3.

In this friction characteristic test, the load in a unit area applied by the weight 6 is set to $2.0 \times 10^4$ Pa, and the moving rate of the table 2 is set to 1 mm/sec. In the organoleptic evaluation test, the load in a unit area applied when a subject touches (rubs) the sample S is approximately $2.0 \times 10^4$ Pa and the moving rate is 10 mm/sec or less at most. By using this apparatus, the average coefficient of friction and the mean deviation of the coefficient of friction are measured with respect to each sample S.

2-2) Compression characteristic:

The compression characteristic seems to correspond to an index of the hardness feeling. For example, in the hardness gage according to JIS-A, a method for measuring the hardness feeling of a sample is defined. However, when this method is employed, measurement results correlated to the organoleptic evaluation test results cannot be obtained. This is probably because the tip of a presser used in the measurement according to JIS-A is so thin that the compression load applied in a unit area of the surface of the sample S is excessively as large as $2.0 \times 10^7$ Pa.

Figure 2:
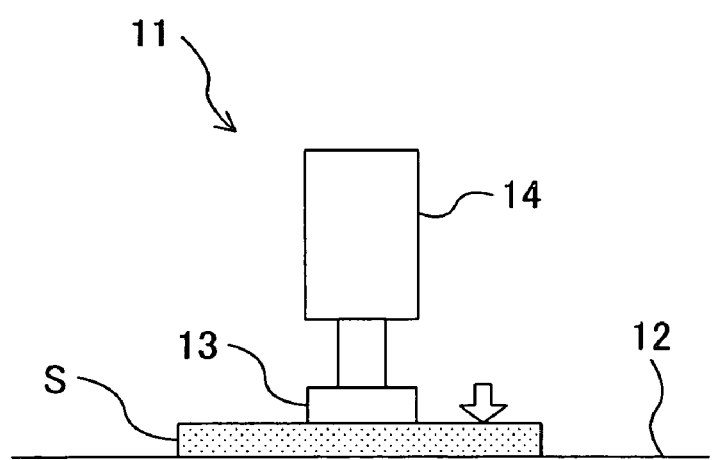
FIG. 2 is a diagram for showing the structure of a test apparatus used in a compression characteristic test.

In other words, it seems that the hardness feeling is concerned with a small load applied by gently touching the sample S. Therefore, in this embodiment, a test apparatus 11 (a KES compression tester) whose structure is roughly shown in FIG. 2 is used for measuring the compression characteristic of each sample. Specifically, with a sample S placed on a fixed table 12, the surface of the sample S is pressed with a presser 13 having a flat lower face so as to measure the compression characteristic with a compression sensor 14. In this case, the compression load in a unit area is set to $3.0 \times 10^3$ Pa. When this measurement method is employed, data positively correlated to the organoleptic evaluation test results are obtained.

Figure 3:
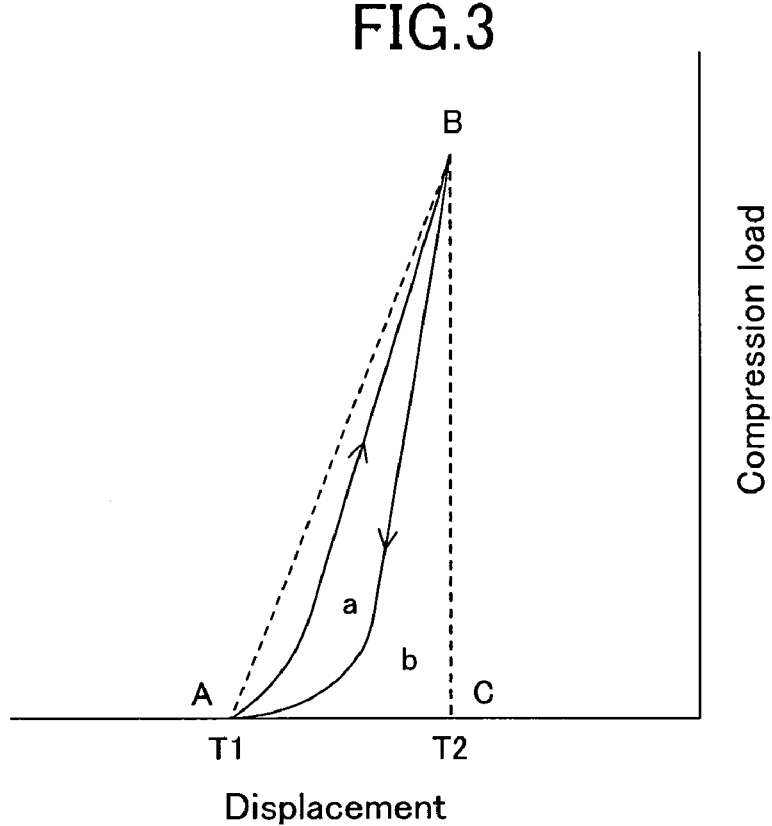
FIG. 3 is a diagram of a modeled displacement-load characteristic curve.

Therefore, this apparatus is used for measuring a displacement-load characteristic of each sample S, and respective parameters of a compression work load, a compression recovery work load, a compression recovery property, compression rigidity, compression distortion, and a compression distortion factor which are calculated on the basis of a characteristic curve of the displacement-load characteristic. FIG. 3 shows a modeled displacement-load characteristic curve. With reference to FIG. 3, the aforementioned parameters will be described. The respective parameters can be obtained as follows:

Compression work load (gf·cm/cm$^2$)=area a+area b
Compression recovery work load (gf·cm/cm$^2$)=area b
Compression recovery property (%)=(compression recovery work load/compression work load)×100
Compression rigidity (%)=(area a+area b)/area of triangle ABC×100
Compression distortion (cm)=T1−T2
Compression distortion factor (%)=[(T1−T2)/T1]×100

In the aforementioned calculations, T1 indicates an initial thickness of the sample, and T2 indicates the thickness of the sample obtained under the maximum load ($3.0 \times 10^3$ Pa, 30 gf/cm$^2$).

(3) Thermoplastic elastomer composition and molded member made of the same:

As described above, the humidity feeling and the hardness feeling largely affect the tactile quality of the surface of a surface material. Therefore, it is necessary to use a material having these feelings balanced in order to obtain a surface material having a high tactile quality.

Therefore, first of all, it can be considered that the humidity feeling and the hardness feeling are adjusted so as to be balanced in a conventional thermoplastic elastomer (TPO) by balancing a rubber component and a PP (polypropylene) component. However, when the amount of the rubber component is increased so as to make the thermoplastic elastomer as soft as a vinyl chloride-based resin, the resultant surface material feels too clammy, and when the amount of the rubber component is reduced so as to make the thermoplastic elastomer as moist as a vinyl chloride-based resin, the resultant surface material feels too hard. Accordingly, it is difficult to attain a high tactile quality by balancing the humidity feeling and the hardness feeling through adjustment of the rubber component and the PP component.

Alternatively, it can be considered that the humidity feeling and the hardness feeling are improved by allowing, for example, the thermoplastic elastomer to include a third component. For example, when gel silicone rubber is included in the thermoplastic elastomer as the third component so that the silicone rubber can be disposed on the surface, the humidity feeling and the hardness feeling can be consistent. However, in this case, the cost is disadvantageously increased.

Figure 4:
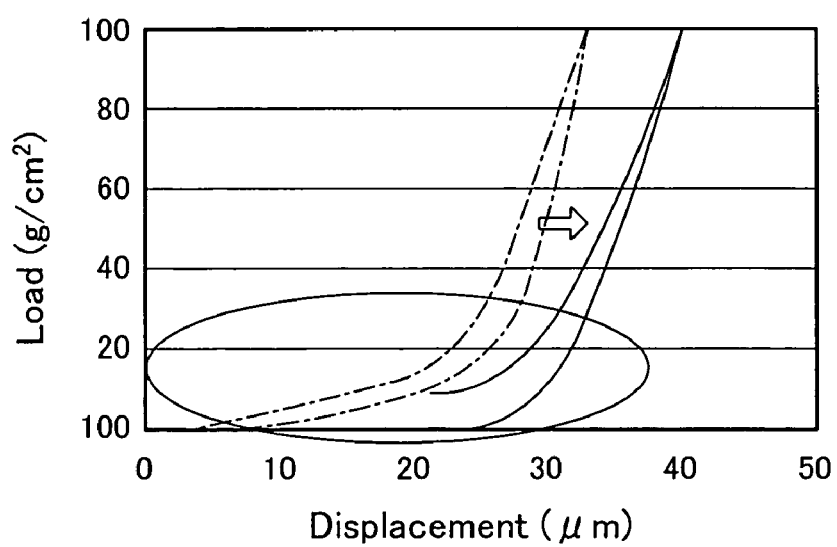
FIG. 4 is a diagram for showing the compression characteristics of a vinyl chloride-based resin and a thermoplastic elastomer.

Also, as shown in FIG. 4, it has been found that the compression characteristic is more largely deformed under a small load in a vinyl chloride-based resin (shown with a solid curve in FIG. 4) than in an experimental sample of TPO (shown with an alternate long and short dash curve in FIG. 4). In other words, the hardness feeling of a surface material depends upon an initial rise in the relationship between the distortion and the pressure.

Therefore, in this embodiment, the hardness feeling is improved by modifying a resin component. This is because when the hardness feeling is improved by adjusting the content of a rubber component, the humidity feeling is degraded.

Specifically, because the initial rise in the relationship between the distortion and the pressure is significant for the hardness feeling as described above, PB-1, which has a lower elastic modulus and is softer than PP, is substituted for part of the PP component. Thus, the hardness feeling can be improved without degrading the humidity feeling. Also, PB-1 has an SP value of 8.3, which is substantially the same as the SP value of PP (which is 8.1). Therefore, the PP and the PB-1 components are homogeneously mixed, so that the hardness feeling can be definitely improved.

Also in this embodiment, the humidity feeling is improved by improving the quality of a rubber component. This is because when the humidity feeling is improved by adjusting the content of the rubber component, the hardness feeling is degraded.

Specifically, a rubber component employed in this embodiment is olefin-based rubber including EPDM (ethylene-propylene-diene monomer). The EPDM component has an SP value of 8.0, which is substantially the same as those of the PP and the PB-1 components. Therefore, the EPDM component has high compatibility with the resin component and is finely dispersed in the resin. When compatibility between a rubber component and a resin component is poor, large rubber masses are formed in the surface portion which result in increasing the clammy feeling and degrading the humidity feeling on the surface. However, the humidity feeling can be improved without degrading the hardness feeling by finely dispersing the rubber component in the resin.

The olefin-based rubber component may further include EOR (ethylene-octene rubber). In the fabrication processing for the TPO, the EOR may be added in the same step as the EPDM component. Therefore, when the EOR is employed, the fabrication cost can be lowered. Also, the EOR has an SP value of 8.1, and hence has higher compatibility with the resin component than the EPDM component. Therefore, even when the EOR is included, the humidity feeling is not degraded.

Next, preferable contents of the PP component, the PB-1 component, the EPDM component, and the EOR in the thermoplastic elastomer composition and preferable characteristic values of a molded member made of the thermoplastic elastomer composition will be described. Herein, eight kinds of thermoplastic elastomer compositions of Examples 1 through 6 and Comparative Examples 1 and 2 respectively having different contents of the PP component, the PB-1 component, the EPDM component, and the EOR are fabricated. The compositions of these thermoplastic elastomer compositions are listed in Table 1 below. It is noted that the content of each component is shown in weight % (wt %) in Table 1 and FIGS. 5 through 7 and 10 described later.

TABLE 1

|  | PP(wt %) SP: 8.1 | PB-1 (wt %) SP: 8.3 | EPDM (wt %) SP: 8.0 | EOR (wt %) SP: 8.1 | EPDM + EOR (wt %) (total olefin-based rubber) | Mineral oil + silicone oil (wt %) | PB-1/ (PP + PB) (%) | PB-1/ (PP + PB-1 + EPDM + EOR) (%) | (PP + PB-1)/ (PP + PB-1 + EPDM + EOR) (%) | (PP + PB-1)/ (EPDM + EOR) (%) |
|---|---|---|---|---|---|---|---|---|---|---|
| Example 1 | 13 | 22 | 43 | 0 | 43 | 22 | 63 | 28 | 45 | 81 |
| Example 2 | 9 | 21 | 41 | 8 | 49 | 21 | 70 | 27 | 38 | 61 |
| Example 3 | 7 | 31 | 30 | 18 | 48 | 15 | 82 | 36 | 44 | 79 |
| Example 4 | 6 | 31 | 35 | 9 | 44 | 19 | 84 | 38 | 46 | 84 |
| Example 5 | 4 | 33 | 19 | 15 | 34 | 29 | 89 | 46 | 52 | 109 |
| Example 6 | 13 | 26 | 39 | 0 | 39 | 22 | 67 | 33 | 50 | 100 |
| Comparative Example 1 | 15 | 18 | 45 | 0 | 45 | 23 | 55 | 23 | 42 | 73 |
| Comparative Example 2 | 22 | 0 | 53 | 0 | 53 | 26 | 0 | 0 | 29 | 42 |

In this case, Comparative Example 2 corresponds to a thermoplastic elastomer composition void of PB-1. Also, Examples 1 and 6 and Comparative Examples 1 and 2 correspond to thermoplastic elastomer compositions void of EOR. In all of Examples 1 through 6 and Comparative Examples 1 and 2, the mineral oil and the silicone oil are included from viewpoints of a mixing property of the components and a molding property of the molded member.

A member sample is fabricated by using each of the aforementioned thermoplastic elastomer compositions, and each sample is subjected to the organoleptic evaluation test. The results are shown in Table 2 below. In this organoleptic evaluation, each sample is ranked as one of four grades of "good", "rather good", "rather bad", and "bad".

TABLE 2

|  | Tactile quality | Minimum rubber particle size of outermost layer (μm) | Maximum rubber particle size of outermost layer (μm) | Average coefficient of friction | Mean deviation of coefficient of friction | Compression work load (gf · cm/cm²) | Compression recovery property (%) | Compression rigidity (%) | Compression recovery work load (gf · cm/cm²) | Compression distortion (cm) |
|---|---|---|---|---|---|---|---|---|---|---|
| Example 1 | good | 0.3 | 1.7 | 0.1638 | 0.0123 | 0.0359 | 53.1 | 82.6 | 0.0192 | 0.00197 |
| Example 2 | good | 0.3 | 2.5 | 0.2275 | 0.0147 | 0.0233 | 54.3 | 79.9 | 0.0127 | 0.00195 |
| Example 3 | good | — | — | 0.1843 | 0.0138 | 0.0255 | 54.0 | 78.3 | 0.0137 | 0.00367 |
| Example 4 | good | — | — | 0.1643 | 0.0152 | 0.0239 | 50.7 | 84.6 | 0.0123 | 0.00188 |
| Example 5 | good | — | — | 0.1928 | 0.0153 | 0.0249 | 56.6 | 83.9 | 0.0142 | 0.00198 |
| Example 6 | rather good | — | — | 0.1765 | 0.0169 | 0.0201 | 49.1 | 84.0 | 0.0099 | 0.00160 |

TABLE 2-continued

|  | Tactile quality | Minimum rubber particle size of outermost layer (μm) | Maximum rubber particle size of outermost layer (μm) | Average coefficient of friction | Mean deviation of coefficient of friction | Compression work load (gf · cm/cm²) | Compression recovery property (%) | Compression rigidity (%) | Compression recovery work load (gf · cm/cm²) | Compression distortion (cm) |
|---|---|---|---|---|---|---|---|---|---|---|
| Comparative Example 1 | bad | 0.3 | 6.0 | 0.4575 | 0.0258 | 0.0208 | 51.5 | 76.7 | 0.0108 | 0.00181 |
| Comparative Example 2 | rather bad | — | — | 0.2380 | 0.0113 | 0.0187 | 52.6 | 67.5 | 0.0098 | 0.00187 |

Furthermore, with respect to each of the samples, the friction characteristic and the compression characteristic are measured in accordance with the aforementioned measurement methods. The results are also listed in Table 2.

First, preferable contents of the PP; the PB-1, and the olefin-based rubber components are examined.

Figure 5:
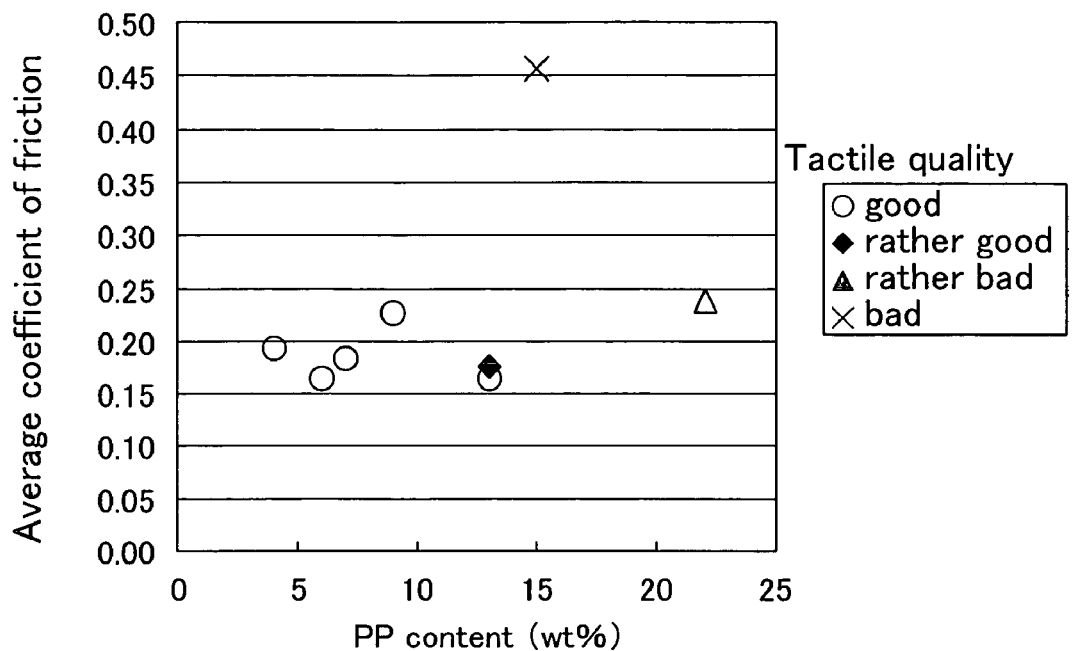
FIG. 5 is a diagram in which results of an organoleptic evaluation test are plotted on a PP content-average coefficient of friction plane.

FIG. 5 is a diagram obtained by plotting the results of the organoleptic examination test of the samples of Examples 1 through 6 and Comparative Examples 1 and 2 on a PP content (wt %)–average coefficient of friction plane.

On the basis of FIG. 5, the contents of the PP component in the thermoplastic elastomer compositions that are evaluated as "good" or "rather good" in the organoleptic evaluation are 14 wt % or less. This is probably because when the content of the PP component is too large, the surface of the resultant member is so hard that the hardness feeling is degraded. On the other hand, since the PB-1 component is a liquid, when the content of the PP component is too small, the resultant member cannot keep its shape. From this point of view, the content of the PP component is preferably 2 wt % or more. Accordingly, the content of the PP component is preferably 2 through 14 wt %.

Figure 6:
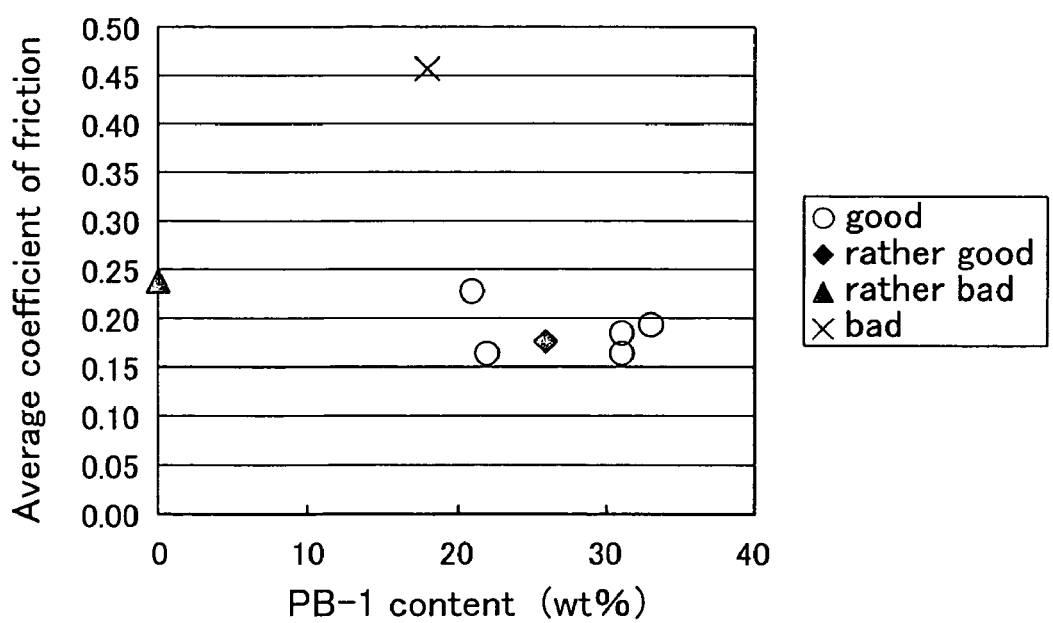
FIG. 6 is a diagram in which the results of the organoleptic evaluation test are plotted on a PB-1 content-average coefficient of friction plane.

FIG. 6 is a diagram obtained by plotting the results of the organoleptic evaluation test on a PB-1 content (wt %)-average coefficient of friction plane. The contents of the PB-1 component in the thermoplastic elastomer compositions that are evaluated as "good" or "rather good" in the organoleptic evaluation are 19 wt % or more. This is probably because when the content of the PB-1 component is too small, the surface of the resultant member is so hard that the hardness feeling is degraded. Also, when the content of the PB-1 component is too large, the resultant member cannot keep its shape. From this point of view, the content of the PB-1 component is preferably 35 wt % or less. Accordingly, the content of the PB-1 component is preferably 19 through 35 wt %.

Figure 7:
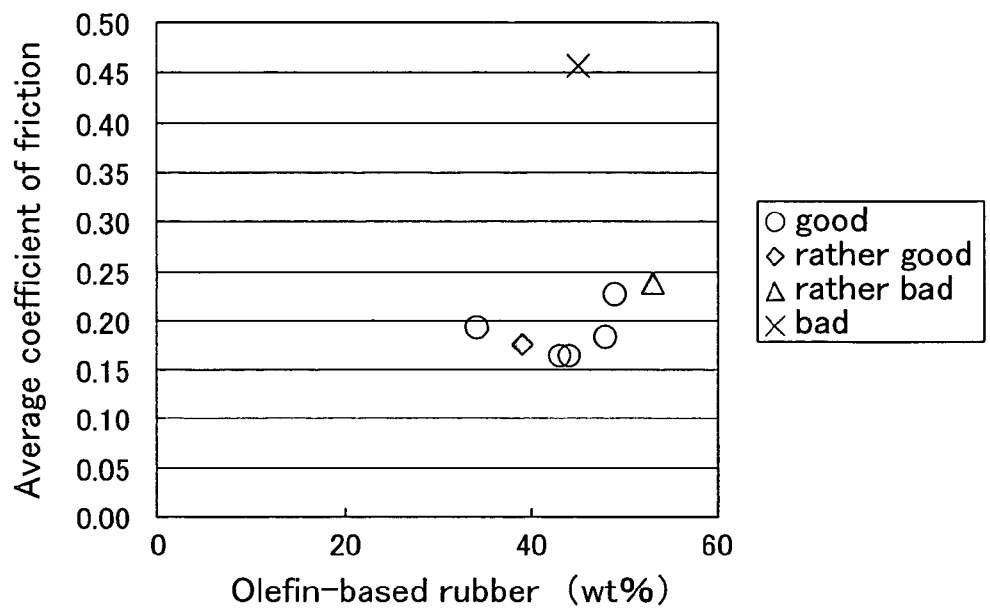
FIG. 7 is a diagram in which the results of the organoleptic evaluation test are plotted on an olefin-based rubber content-average coefficient of friction plane.

FIG. 7 is a diagram obtained by plotting the results of the organoleptic evaluation test on an olefin-based rubber (EPDM+EOR) content (wt %)-average coefficient of friction plane. On the basis of FIG. 7, the contents of the olefin-based rubber component in the thermoplastic elastomer compositions that are evaluated as "good" or "rather good" in the organoleptic evaluation are 30 through 52 wt %. This is probably because when the content of the olefin-based rubber component is too small, the surface of the resultant member is so hard that the hardness feeling is degraded, and when the content of the olefin-based rubber component is too large, the surface of the resultant member feels so clammy that the humidity feeling is degraded.

Figure 8:
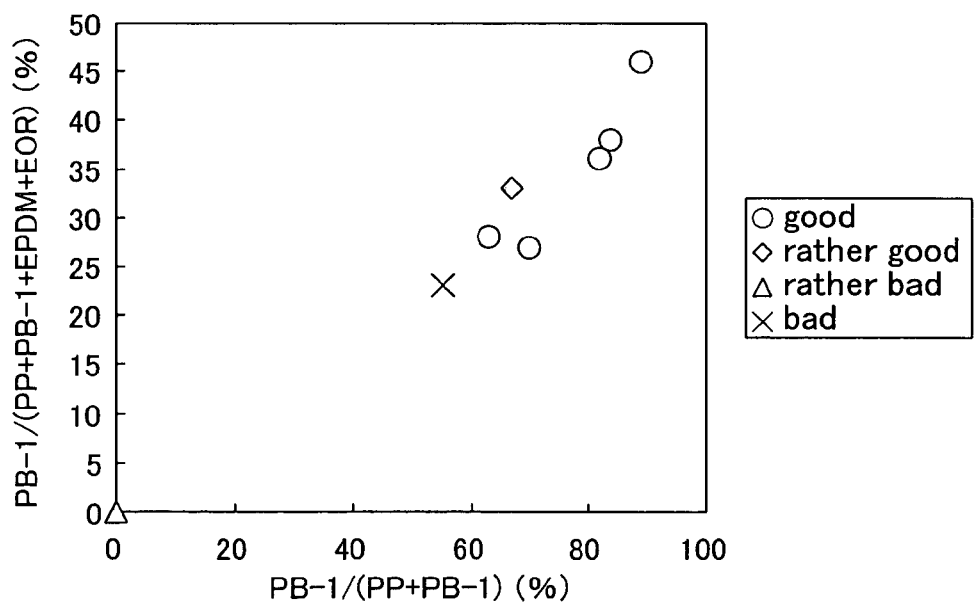
FIG. 8 is a diagram in which the results of the organoleptic evaluation test are plotted on a [PB-1/(PP+PB-1)]–[PB-1/(PP+PB-1+olefin-based rubber)] plane.

Next, in order to examine a preferable proportion among the contents of the PP, the PB-1, and the olefin-based rubber components, the results of the organoleptic evaluation test are plotted on a plane with the ordinate indicating a weight ratio of PB-1/(PP+PB-1+olefin-based rubber) (%) and the abscissa indicating a weight ratio of PB-1/(PP+PB-1) (%), which is shown in FIG. 8. On the basis of FIG. 8, the thermoplastic elastomer compositions evaluated as "good" or "rather good" in the organoleptic evaluation have the ratio PB-1/(PP+PB-1) of 56 through 90% and the ratio PB-1/(PP+PB-1+olefin-based rubber) of 25 through 47%.

Accordingly, the thermoplastic elastomer composition preferably has the following composition:
  polypropylene (PP): 2 through 24 wt %
  poly(1-butene) (PB-1): 19 through 35 wt %
  olefin-based rubber: 30 through 52 wt %
  weight ratio of PB-1/(PP+PB-1): 56 through 90%
  weight ratio of PB-1/(PP+PB-1+olefin-based rubber): 25 through 47%

Figure 9:
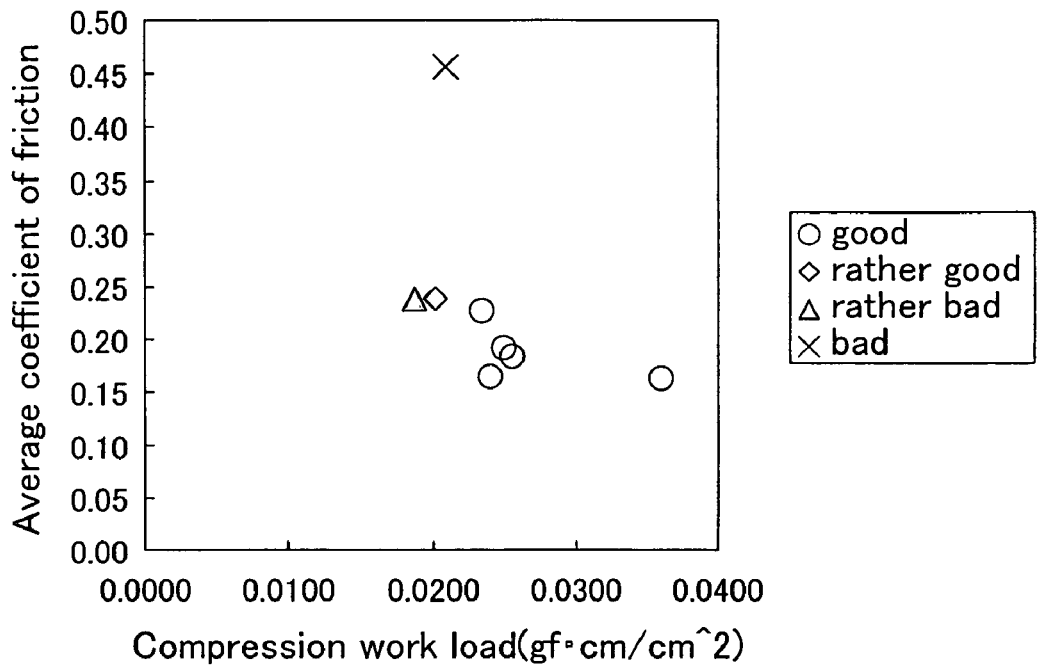
FIG. 9 is a diagram in which the results of the organoleptic evaluation test are plotted on a compression work load-average coefficient of friction plane.

Next, preferable characteristic values of the molded member are examined. FIG. 9 is a diagram obtained by plotting the results of the organoleptic evaluation test on a compression work load-average coefficient of friction plane. On the basis of FIG. 9, the molded members evaluated as "good" in the organoleptic evaluation test have an average coefficient of friction of 0.27 or less and a compression work load of 0.022 gf·cm/cm² ($0.022 \times 10^{-2}$ N·cm/cm²) or more.

Figure 10:
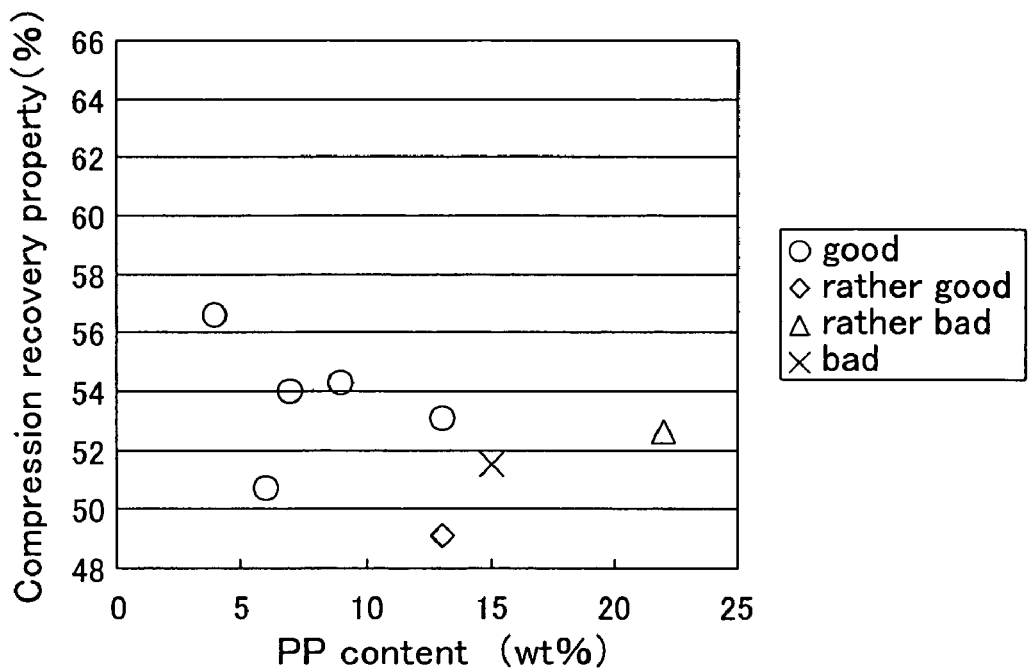
FIG. 10 is a diagram in which the results of the organoleptic evaluation test are plotted on a PP content-compression recovery property plane.

FIG. 10 is a diagram obtained by plotting the results of the organoleptic evaluation test on a PP content-compression recovery property plane. On the basis of FIG. 10, the molded members evaluated as "good" in the organoleptic evaluation test have a compression recovery property of 53 through 65% with variation in the test considered.

Figure 11:
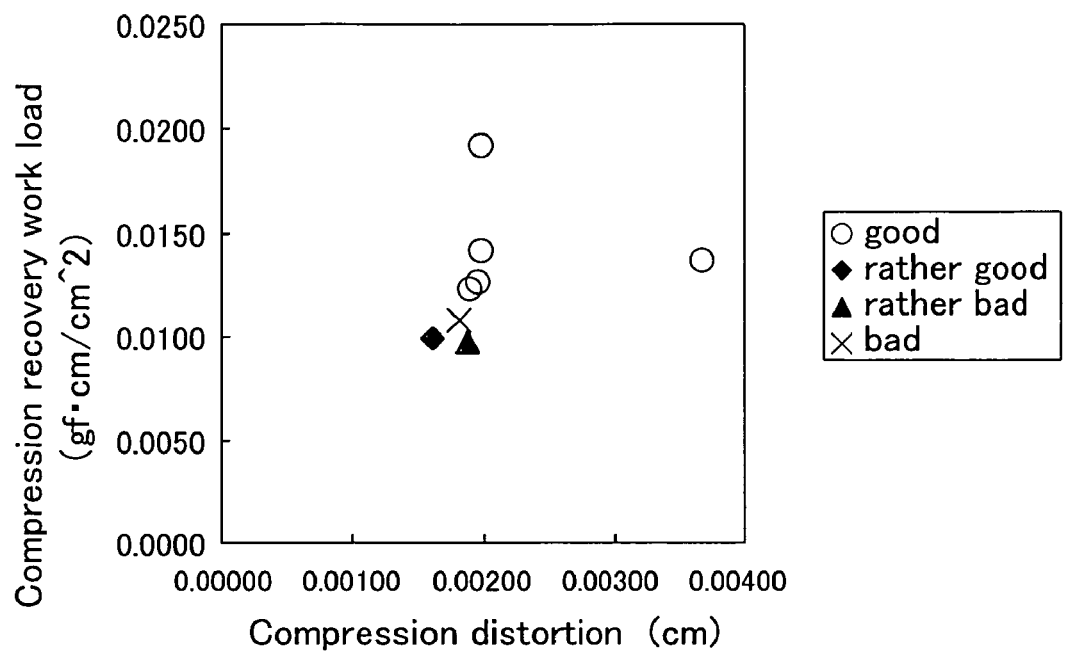
FIG. 11 is a diagram in which the results of the organoleptic evaluation test are plotted on a compressive distortion-compression recovery work load plane.

FIG. 11 is a diagram obtained by plotting the results of the organoleptic evaluation test on a compression distortion-compression recovery work load plane. On the basis of FIG. 11, the molded members evaluated as "good" in the organoleptic evaluation have a compression recovery work load of 0.012 gf·cm/cm² ($0.012 \times 10^{-2}$ N·cm/cm²) or more and compression distortion of 0.0019 cm or more.

Figure 12:
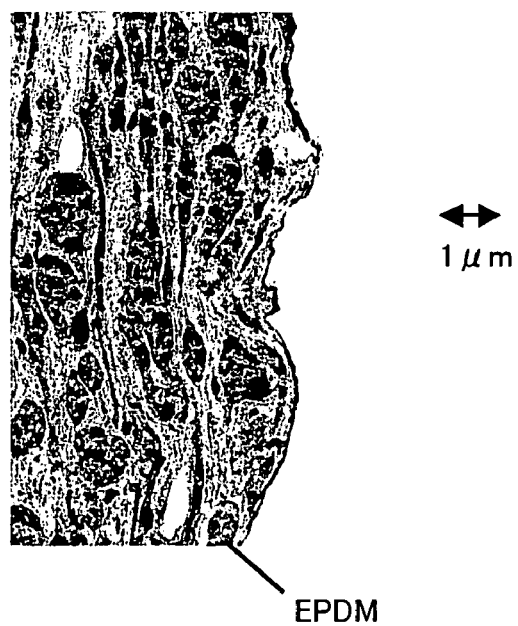
FIG. 12 is a photomicrograph of a surface portion of TPO of Example 1.
Figure 13:
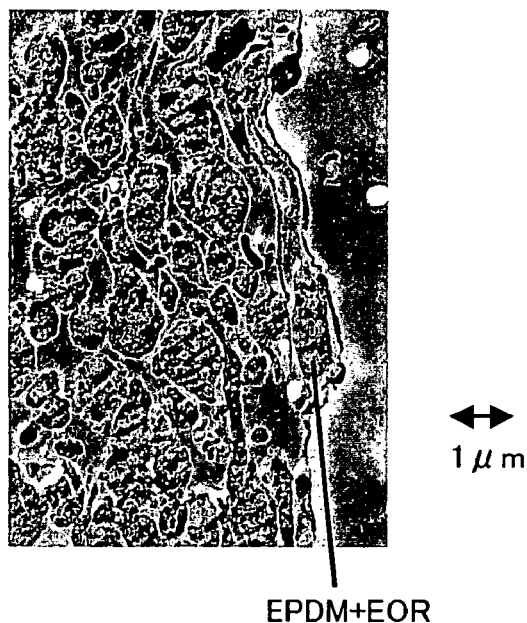
FIG. 13 is a photomicrograph of a surface portion of TPO of Example 2.
Figure 14:
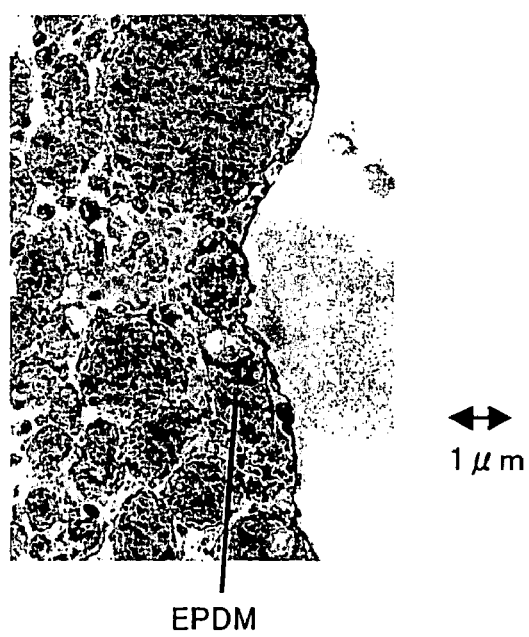
FIG. 14 is a photomicrograph of a surface of TPO of Comparative Example 1.

Accordingly, the preferable characteristic values of the molded member are as follows:
  average coefficient of friction: 0.27 or less with a compression work load of 0.022 gf·cm/cm² or less
  compression recovery property: 53 through 65%
  compression recovery work load: 0.012 gf·cm/cm² with compression distortion of 0.0019 cm or more Ultimately, a preferable rubber particle size in the thermoplastic elastomer composition is examined. FIGS. 12 and 13 are photomicrographs of enlarged surface portions of the molded members made of the thermoplastic elastomer compositions of Examples 1 and 2, which are evaluated as "good" in the organoleptic evaluation, and FIG. 14 is a photomicrograph of an enlarged surface portion of the molded member made of the thermoplastic elastomer composition of Comparative Example 1, which is evaluated as "bad" in the organoleptic evaluation. Also, Table 2 above lists the minimum rubber particle sizes and the maximum rubber particle sizes in the surface portions of Examples 1 and 2 and Comparative Example 1.

First, referring to FIG. 14, comparatively large rubber masses (corresponding to black portions in the drawing) are present in the surface portion of the molded member of Comparative Example 1. In contrast, referring to FIGS. 12 and 13, such a large rubber mass is not observed in the surface portions of the molded members of Examples 1 and 2. Hence, it can be understood that the size of the rubber mass is small in these molded members. These results seem to reveal that when a large rubber mass is present in a surface portion of a molded member, the surface feels so clammy that the humidity feeling is degraded.

In other words, the maximum rubber particle size in the surface portion of the member is preferably 3 μm or less. Thus, the degradation of the humidity feeling can be suppressed. Although the rubber particle size is preferably smaller from the viewpoint of the humidity feeling, when the rubber particle sizes in the thermoplastic elastomer are too small, the impact resistance of the resultant molded member is lowered. Therefore, the rubber particle size is preferably 0.3 μm or more.

The surface material for a vehicle trim of this embodiment can be fabricated with very high production efficiency by using, for example, injection molding. The material is also effectively applicable to other products, such as a console lid, an instrument panel and switches, or to other products molded by processing other than injection molding.

Furthermore, the surface material (i.e., the molded member with a thermoplastic property) of this embodiment can be used for fabricating a module trim component for a car, such as a lift gate module, a trim module or a door module, having a large strength and a high tactile quality by injection molding the thermoplastic elastomer material as a first layer on a top surface of a molded member and by injection molding continuous glass fiber reinforced PP as a second layer on a reverse face of the molded member.

What is claimed is:

1. A thermoplastic elastomer composition comprising:
   2 through 14 mass % of polypropylene (PP);
   19 through 35 mass % of poly(1-butene) (PB-1); and
   30 through 52 mass % of olefin-based rubber including an ethylene-propylene-diene monomer and an ethylene-octene rubber but not including a polypropylene and having a solubility parameter value of 7.5 through 8.5,
   wherein a weight ratio of PB-1/(PP+PB-1) is 56 through 90% and a weight ratio of PB-1/(PP+(PB-1)+olefin-based rubber) is 25 through 47%.

2. The thermoplastic elastomer composition of claim 1, wherein said olefin-based rubber has a particle size of 0.3 μm or more.

* * * * *